(12) United States Patent
Spremo et al.

(10) Patent No.: US 7,516,890 B1
(45) Date of Patent: Apr. 14, 2009

(54) INTERACTIVE INVENTORY MONITORING

(75) Inventors: Stevan M. Spremo, San Jose, CA (US);
Usen E. Udoh, San Francisco, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/444,807

(22) Filed: May 25, 2006

(51) Int. Cl.
*G06F 19/00* (2006.01)
*G06Q 30/00* (2006.01)
*G06Q 90/00* (2006.01)

(52) U.S. Cl. ............. 235/385; 705/22; 705/28; 340/5.92

(58) Field of Classification Search ......... 235/385, 235/383; 340/5.92, 572.1–572.9, 686.1, 340/825.36, 10.1–10.6, 825.49; 700/215–227; 705/22, 28
See application file for complete search history.

(56) References Cited

U.S. PATENT DOCUMENTS

| | | | | |
|---|---|---|---|---|
| 4,507,653 A * | 3/1985 | Bayer | ............ | 340/539.32 |
| 4,598,275 A * | 7/1986 | Ross et al. | ............ | 340/573.4 |
| 5,886,634 A * | 3/1999 | Muhme | ............ | 340/572.1 |
| 5,963,134 A * | 10/1999 | Bowers et al. | ............ | 340/572.1 |
| 6,232,870 B1 * | 5/2001 | Garber et al. | ............ | 340/10.1 |
| 6,327,576 B1 * | 12/2001 | Ogasawara | ............ | 705/22 |
| 6,388,569 B1 * | 5/2002 | Engellenner | ............ | 340/505 |
| 6,424,264 B1 * | 7/2002 | Giraldin et al. | ............ | 340/573.1 |
| 6,895,330 B2 * | 5/2005 | Cato et al. | ............ | 701/209 |
| 6,930,607 B2 * | 8/2005 | Kiel et al. | ............ | 340/573.1 |
| 7,023,344 B2 * | 4/2006 | Schaper | ............ | 340/572.4 |
| 7,123,149 B2 * | 10/2006 | Nowak et al. | ............ | 340/572.1 |
| 7,205,894 B1 * | 4/2007 | Savage | ............ | 340/568.6 |
| 2001/0000019 A1 * | 3/2001 | Bowers et al. | ............ | 340/572.1 |
| 2003/0117281 A1 * | 6/2003 | Sriharto et al. | ............ | 340/568.1 |
| 2005/0004801 A1 * | 1/2005 | Liebermann | ............ | 704/271 |
| 2005/0137943 A1 * | 6/2005 | Holzman | ............ | 705/28 |
| 2006/0095331 A1 * | 5/2006 | O'Malley et al. | ............ | 705/22 |

* cited by examiner

*Primary Examiner*—Steven S Paik
*Assistant Examiner*—Christle I Marshall
(74) *Attorney, Agent, or Firm*—John F. Schipper; Robert M. Padilla (57) ABSTRACT

Method and system for monitoring present location and/or present status of a target inventory item, where the inventory items are located on one or more inventory shelves or other inventory receptacles that communicate with an inventory base station through use of responders such as RFIDs. A user operates a hand held interrogation and display (IAD) module that communicates with, or is part of, the base station, to provide an initial inquiry. Information on location(s) of the target inventory item is also indicated visibly and/or audibly on the receptacle(s) for the user. Status information includes an assessment of operation readiness and a time, if known, that the specified inventory item or class was last removed or examined or modified. Presentation of a user access level may be required for access to the target inventory item. Another embodiment provides inventory information for a stack as a sight-impaired or hearing-impaired person passes adjacent to that stack.

9 Claims, 5 Drawing Sheets

INTERACTIVE INVENTORY MONITORING

ORIGIN OF THE INVENTION

This invention was made, in part, by one or more employees of the U.S. government. The U.S. government has the right to make, use and/or sell the invention described herein without payment of compensation, including but not limited to payment of royalties.

FIELD OF THE INVENTION

This invention related to interactive determination of location and/or status of a selected inventory item among an array of inventory items, for example, a book or document or equipment item or component.

BACKGROUND OF THE INVENTION

Keeping track of inventory, whether books or documents or electronic copies or goods or sensitive material, is a continual task. Determining where an inventory item is presently located, or mislocated, is increasingly time consuming as the inventory grows and items are repaired, maintained, replaced, or moved and recharacterized. Inclusion of a paper slip noting the "history" of the item is only acceptable if the item users are diligent about supplementing this history with an account of recent activities involving the item and/or the present status of the item. Where multiple copies of an inventory item are present and are kept in different locations, the tasks become correspondingly multiplied.

What is needed is a system that (1) indicates whether a selected item or category of items is present in the collection; and, if present, identifies the location(s) of the item(s) using a visually perceptible and/or audibly perceptible signal; and (2) the present condition or status, if known, of the item(s). Preferably, the system should be flexible and should permit implementation of one or more redefined categories for subsequent searches.

SUMMARY OF THE INVENTION

These needs are met by the invention, which provides an interactive system and associated method for querying the array and for determining at least one of (i) location of a selected inventory item and (ii) present status of the inventory item.

The invention is an RFD-based system that, in one embodiment, assists a user in locating an item visually, in response to specification of the item electronically. The item(s) being sought may be a book on a library shelf, an item from a store inventory, a legal or financial document, a medical record, a weapon system or weapon component (presumably) located in an armory, or similar item. Each such item is tagged by a radio frequency identity detector (RFID), which does not require a battery but is preferably powered using an electromagnetic coil that is embedded in or associated with the item. The shelving or other containment vessel or receptacle for the item(s) provides an alternating electromagnetic field to power the embedded coils and can identify the item location if the item is on or adjacent to the shelving/vessel, even if the item is not at its assigned location. Each coil includes a low power, programmable chip containing relevant information on the item (id. no., class to which item belongs, present status of the item, relevant item characteristics, recent activity affecting the item, etc.)

Removal of the item from the receptacle may first require entry of specified information, including but not limited to user name, user contact information, user priority level (if relevant), date the item was removed, and user authentication information. An associated light emitting diode (LED) array containing different colored LED light sources is optionally included for visual indication of location(s) of the item.

A desired item is specified and/or categorized using a database system with a computer interface. The interface may be a portable wireless electronic unit that communicates with the database and with the item(s) sought. When queried, the interface downloads information on the item from the database and from the shelving/vessel (e.g., availability and/or present location and/or present status of the item). Based upon a color code scheme assigned to the particular handheld unit, the shelving/vessel LED array displays the corresponding distinguishable color scheme wherever the item(s) is located.

This system can also provide security for an inventory of weapon systems, weapons components, and biological/mechanical warfare substances or other sensitive items that require extreme protection. In this instance, the inventory receptacle is powered continuously, and each protected item emits a unique encrypted code associated with the item, when the item is on or in or adjacent to the receptacle at its assigned location. When the protected item is not on or adjacent to the receptacle at its assigned location, or is located elsewhere on or adjacent to the receptacle, an alarm or notification signal is issued by the system, indicating when the item was last sensed at its assigned location. Use of an encrypted code of appropriate complexity can minimize or eliminate the possibility of "spoofing" to cover absence of the protected item. Entry of an encrypted password allowing access to the protected. item could be used to avoid prompt issuance of an alarm signal.

DESCRIPTION OF BEST MODES OF THE INVENTION

Figure 1:
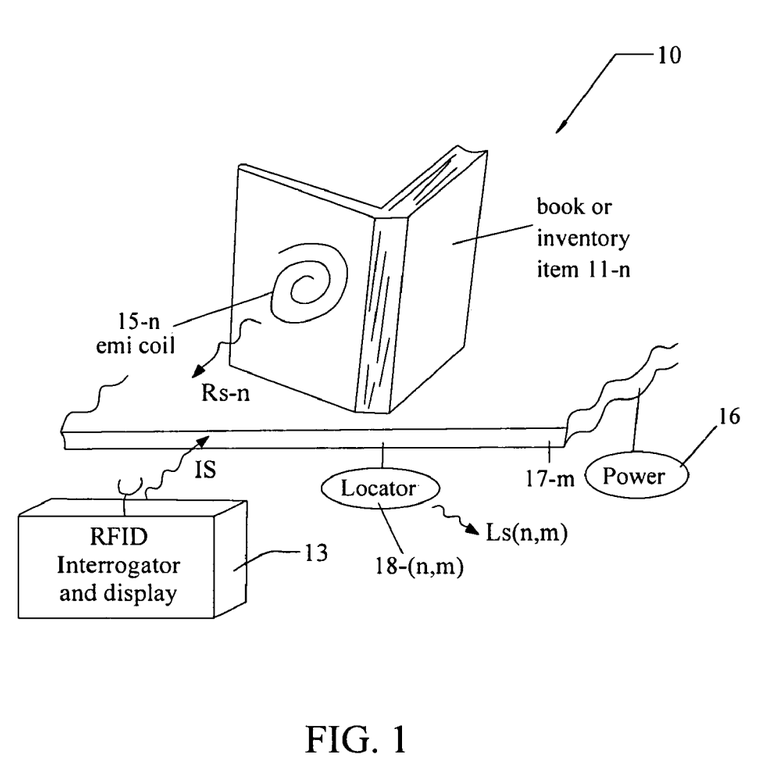
FIG. 1 schematically illustrates use of an RFID interrogator and display to locate an inventory item or class of such items.

FIG. 1 schematically illustrates use of an RFID interrogator and display system 10 to locate an inventory item 11-$n$ ($n=1, \ldots, N$; $N \geq 2$) or class of such items. In this illustration, the inventory item is a book or document, but the invention applies to more general inventory items as well. A user (not shown) carries a hand held radio frequency identity detector ("RFID") interrogation and display ("IAD") system 13. The user enters an indicium, identifying or characterizing the inventory item, into the IAD system 13 and transmits an interrogation signal IS to a collection of inventory items 11-$n$ or to a server representing the collection, preferably using a wireless interrogation signal IS. Where access to the inventory item is restricted, the user is also required to provide one or more of a biometric indicium, or an authentication code or suitable physical indicium permitting access to and/or physical possession of the item.

The presence of each inventory item that is "in stock," whether properly located or located elsewhere in the inventory collection, is sensed by a first electromagnetic coil and associated responder circuitry 15-*n* that is attached to or associated with each inventory item 11-*n*. One or both of the IAD system 11 and the responder 15-*n* may include an RFID. The responder 15-*n* communicates with and is electrically powered by a second coil or other energy source 16 that is attached to or associated with an inventory receptacle 17-*m* (m= ..., M) that holds or is adjacent to the target inventory item 11-*n*.

The responder 15-*n* receives the interrogation signal IS from the IAD system 13 and responds by transmitting, or causing to be transmitted, a response signal RS-n that is received by the IAD system. The response signal RS-n indicates the presence (or absence) of the target inventory item 11-*n* and the location of the receptacle 17-*m* where the target inventory item might be found. Optionally, a locator module 18-(*n,m*) provides a visually perceptible and/or audibly perceptible location signal LS(n,m) that indicates the receptacle 17-*m* and the particular location on this receptacle where the target inventory item 11-*n* can be found. Optionally, if more than one qualifying target inventory item 11-*n* is present, a locator signal LS(n,m) is provided for one or more or all of the target inventory items 11-*n*. Optionally, the (handheld) IAD system 13 also provides visually perceptible and/or audibly perceptible information on location of the target inventory item(s) 11-*n* and on condition or status of each such inventory item, including one or more of the following: (1) the number of replicas of the target inventory item 11-*n* that should be present, (2) time and date each absent inventory item 11-*n* was removed from the collection, (3) user name, if item has been removed, (4) relevant information on repairs and/or maintenance and/or adjustments performed on the target inventory item(s) 11-*n*, and (5) relevant information on any inventory item that has been substituted for or replaced the original target inventory item 11-*n*.

Figure 2:
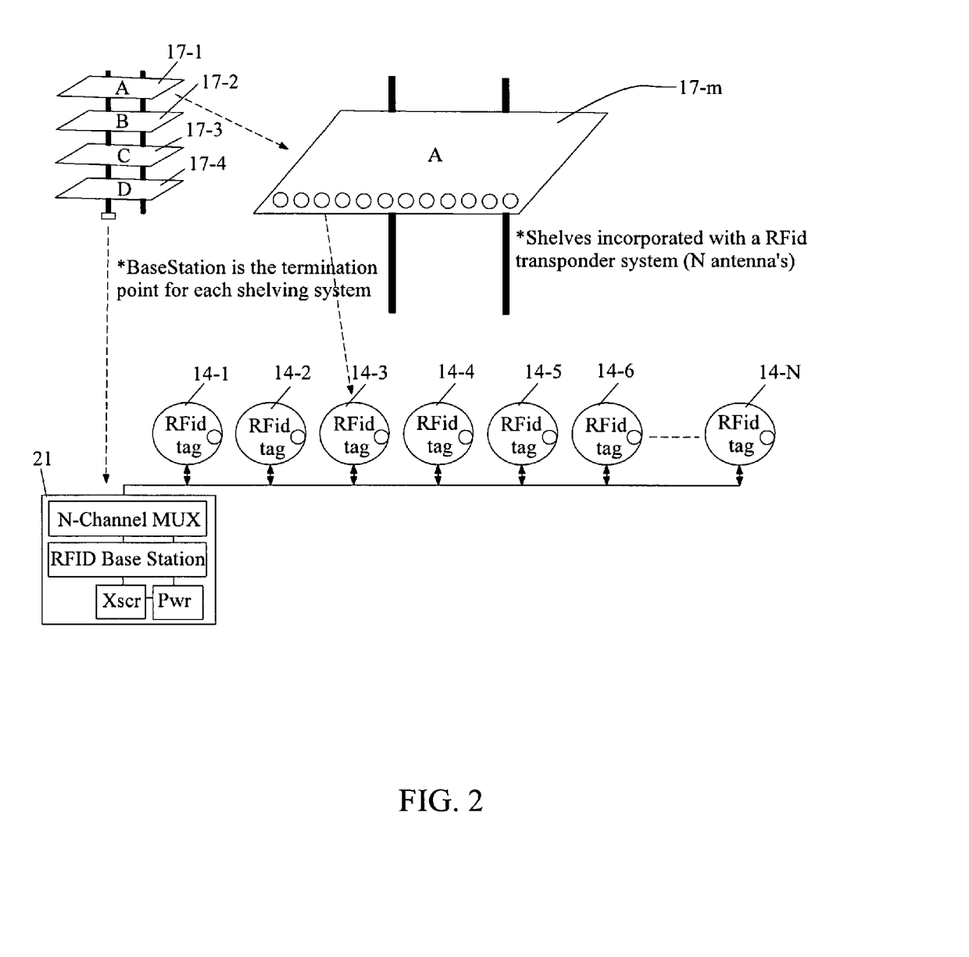
FIG. 2 schematically illustrates operation of a base station RFID with an embedded multiplexer driving a plurality of RFID transponders and their associated antennas.

FIG. 2 schematically illustrates operation of a plurality of RFID tags 14-*n*, each tag being attached to or associated with a location associated with a particular inventory item located on the inventory receptacle 17-*m* Alternatively, the RFID tags 14-*n* may be attached to different spaced apart locations on the inventory receptacle 17-*m*, and a tag at a given location may be activated for receiving and transmitting signals by presence or absence at that location (or within a few cm of that location) of an inventory item; where no inventory item is present at, or near to, the given location, the RFID tag is not activated and does not respond to receipt of an interrogation signal IS. Optionally, one or more RFID adjacent RFID tags 14-*n* (n=n1, n1+1, n1+2, ...) can be activated if the inventory item physically overlaps more than on adjacent space on the inventory receptacle 17-*m*.

An RFID base station or server 21, which may be the IAD system 11 of FIG. 1, generates and transmits an interrogation signal IS-n0 for a target inventory item 15-*n*0 that is received by the plurality of KFID tags 14-*n*. If (and only if) the target inventory item(s) 15-*n*0 is present, circuitry associated with the corresponding RFID tag 14-*n*0 responds with a response signal RS-n0.

A radio frequency identity detector (RFID) is a small radio transmitter, receiver and sensor that can be used, for example, to facilitate labeling, and changes thereto, in a commercial activity. An RFID can be queried, within its transmission range (23 feet in one version), by a hand held device to reveal stored information. Each RFID can have a size as small as a U.S. nickel, but is preferably somewhat larger if information in addition to presence and/or absence is to be reported. In some embodiments disclosed here, an RFID is programmed to automatically transmit selected information at a sequence of specified times, or upon demand.

One version of an RFID operates at about 433 MHz, but this frequency can be varied somewhat to provide distinguishable frequencies among a sequence of RFIDs. Presently, two RFIDs can reliably communicate with each other over a range of up to about 7 meters (approximately 23 feet) in almost any reasonable environment, in temperatures ranging from −40° F. to 185° F., at a rate of 1.8-2.2 pulses/sec. Additional communication range, up to 50-300 feet, can be obtained by supplementing the RFIDs with an external package. Two or more RFID devices use RS232 or RS485 or Ethernet TCP/IP communication protocol to communicate with each other, serial format, in simplex or half duplex modes. A signal transmitted or received by an RFID may be expressed in 256-2048 bits. A given RFID may be read/write (RW) or may be read only (RO), may have a diameter of between 0.625 and 3.75 inches, and may be used with an antenna cable of any reasonable length. Up to four antennas can be linked to a single RFID device, as presently available. Optionally, an RFID system of devices, available from RFID, Inc. in Aurora, Colo. and from other suppliers, includes a handheld reader or reader-programmer, operating at 2.45 GHz, with up to 24 Mbytes of memory. RFIDs are one of several short range wireless communication systems that can be used here.

Where the RFID signal or other information reporting signal has a relatively large number of bits available (256-2048 in the present versions), an RFID signal can include protocol signals and a substantial amount of data. If a single RFID signal from a given source-RFID device cannot carry all the data, two or more RFID signals or packets can be coordinated and used to transmit the data. FIG. 2 illustrates a suitable format for an RFID signal RFIDS-1 that can be used for transmitting data between the source-RFID and the C&C sub-system. An initial block of 8 bits (or more, if desired) optionally includes preamble bits (e.g., 7E or 01111110), followed by: (1) 8 bits that identify the source-RFID by number (e.g., n=0-255); (2) 12 bits that indicate the date and time (to the nearest sec) the RFID signal is initially sent by the source-RFID; (3) 8 bits that identify the RFID (no.) that last (received or generated and) transmitted this signal (the source-RFID or an intermediate RFID in the chain of signal passage); (4) 16 coded bits used to determine or estimate the location and/or spatial orientation of the ESW who wears or carries the source-RFID; (5) 8 bits indicating the estimated temperature at the source-RFID location; (6) 8 bits indicating the estimated pressure at the source-RFID location; (7) 8 bits indicating the estimated concentration of a specified chemical or compound at the source-RFID location (more than one concentration can be transmitted); (8) 8 bits indicating the estimated electromagnetic field intensity at the source-RFD location; (9) 8 bits indicating a visible light index at the source-RFID location; (10) 8 bits indicating an average noise intensity at the source-RFID location; (11) 8 bits indicating a peak noise intensity at the source-RFID location; (12) 8 bits estimating the flux of nuclear particles (alphas, betas, gammas and/or ions) at the source-RFID location; (13) 8 bits indicating the estimated oxygen content at the source-RFID location; and (14) an 8-bit pattern (e.g., 10000001) representing a post-amble or closing sequence. If a measurement, among the preceding items (5)-(13), is not included, the corresponding 8-bit field has a coded special pattern, such as 00000000. The total number of bits required for this particular format is about 132 bits. Other signal formats can also be used here, using fewer bits or more bits.

An example of a presently available RFID base station is the Texas Instruments LF Base Station IC TMS3705ADR, which communicates with resonance frequencies in a range 129-140 kHz. Synchronous and asynchronous data transmission are supported, using a phase locked loop clock generation of 16 MHz. The operation voltage is 4.5-5 Volts, and the device operates at temperatures in a range $-40° C. \leq T \leq 85°$ C., with charging range current and sleep mode current of 8 mAmp and 15 μAmp, respectively. Minimum recovery time or dead time between responses to the same or different RFIDs is estimated as a few tens of msec. Pin count is 16, and the package size is 10 mm by 6 mm.

Optionally, the RFID tag senses and transmits one or more of the following information ("status information") concerning an adjacent inventory item: (1) an indicium identifying or characterizing the item (e.g., a title and call number and copy number for a book or document, or an appliance number and copy number for an appliance or device); (2) an indication of when the item was last returned to or placed in/on the receptacle 17-$m$; (3) an indication of the present condition or status (e.g., use-ready, inactivated for maintenance, permanently inactivated, or withdrawn from use) of the item; (4) number of similar or identical inventory items present in the collection of all reporting receptacles; (5) location of other similar or identical items; and/or (6) how often the item has been removed or queried.

When the IAD system 13 in FIG. 1 requests information on location of a specified inventory item, an RFID tag 14-$n$ on each receptacle 17-$m$ for which the specified item is present optionally provides a visually perceptible signal (e.g., a light having a corresponding color, color combination, blink frequency, texture or other visual indicator signal) or an audibly perceptible signal (e.g., a sound having a corresponding audible frequency, combination of frequencies, sound intensity pattern, chirp or other audible indicator signal) at each location of the item, whether the item is correctly shelved or incorrectly shelved; the location of each such item is optionally indicated on the user's IAD system The user can then go to one or more of the indicated locations and retrieve the desired item.

In one embodiment, the IAD system 13 communicates with a base station or server 21 that, in turn, sequentially communicates with each RFID 14-$n$ on each inventory receptacle 17-$m$ (e.g., a shelf), preferably through a signal multiplexing system. For example, each receptacle 17-$m$ may periodically transmit status information for each inventory item on that receptacle to the base station 21, for example, once every K seconds (e.g., K=5-120). The received status information is temporarily stored at the base station 21 in N memory positions (one for each reporting RFID tag on the shelf), these N memory positions are overwritten in the same order when a new sequence of status information items is received for the (same) shelf 17-$m$. Each receptacle shelf 17-$m$ (m=1, . . . , M) has a separate set of status. information item memory positions for receiving and temporarily storing the status information for items on that receptacle. Alternatively, if the cycling through all the receptacles is sufficiently rapid (e.g., once every 1-10 sec), the status information for inventory items on a first receptacle can be partly or wholly overwritten by status information for inventory items on a second receptacle.

Removal of the item from the receptacle may first require entry of specified information, including but not limited to user name, user contact information, user priority level (if relevant), and date the item was removed. Different access levels may be required for different inventory items.

Figure 3:
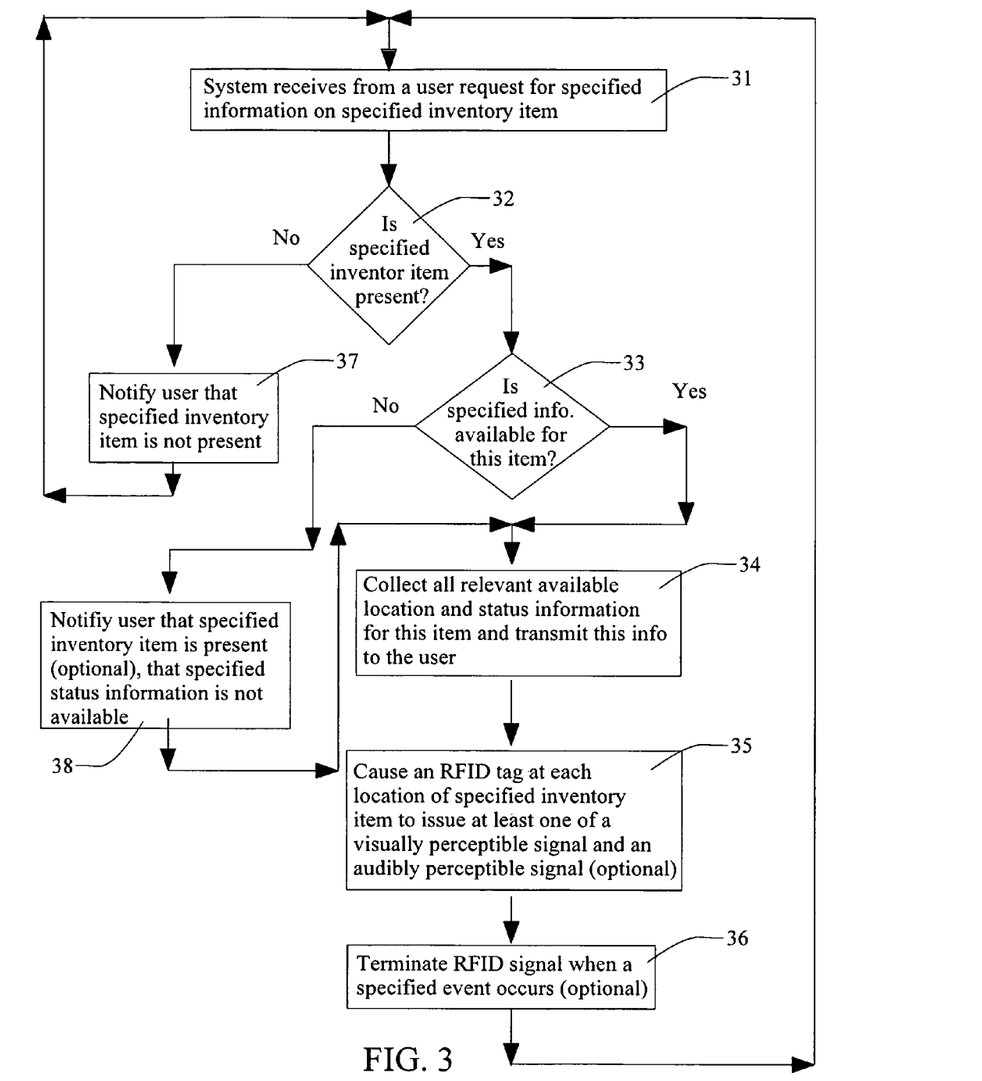
FIG. 3 is a flow chart of a procedure for practicing the invention.

FIG. 3 is a flow chart for one embodiment of a method for practicing the invention. In step 31, the system receives a request from a user for specified information (location, status, etc.) for a specified inventory item. The system queries a base station to determine (i) whether at least one copy of the specified item is present at any location (step 32) and (ii), if the specified item is present, whether the specified status information is available for this item (step 33). If the answer to the queries in steps 32 and 33 are "yes," the system (i) collects all available relevant location and status information for the specified inventory item and transmits this information to the user (step 34) and (ii) optionally causes an RFID tag, at each location at which a copy of the specified inventory item is located, to issue at least one of a visually perceptible signal and an audibly perceptible signal (step 35), which signal is terminated (step 36) (a) after lapse of a specified time interval (e.g., 10-120 sec) or (b) when at least one copy of the specified inventory item is removed from the receptacle shelf, whichever occurs first. The system then returns to step 31.

When the answer to the query in step 32 is "no," the system notifies the user that the specified inventory item is not present, in step 37, and returns to step 31. When the answer to the query in step 33 is "no," the system notifies the user that the specified inventory item is present (optional), notifies the user that the specified status information is not available, in step 38, and moves to step 34.

Where the inventory item is a sensitive one (e.g., a weapon system or component thereof), the invention may be configured to report the presence or absence or non-adjacency of the item at non-regular time intervals (for security purposes), may be configured to promptly report any changes in the status information for the item, and may be configured to require presentation and authentication of a level of permitted access appropriate for the item.

Figure 4:
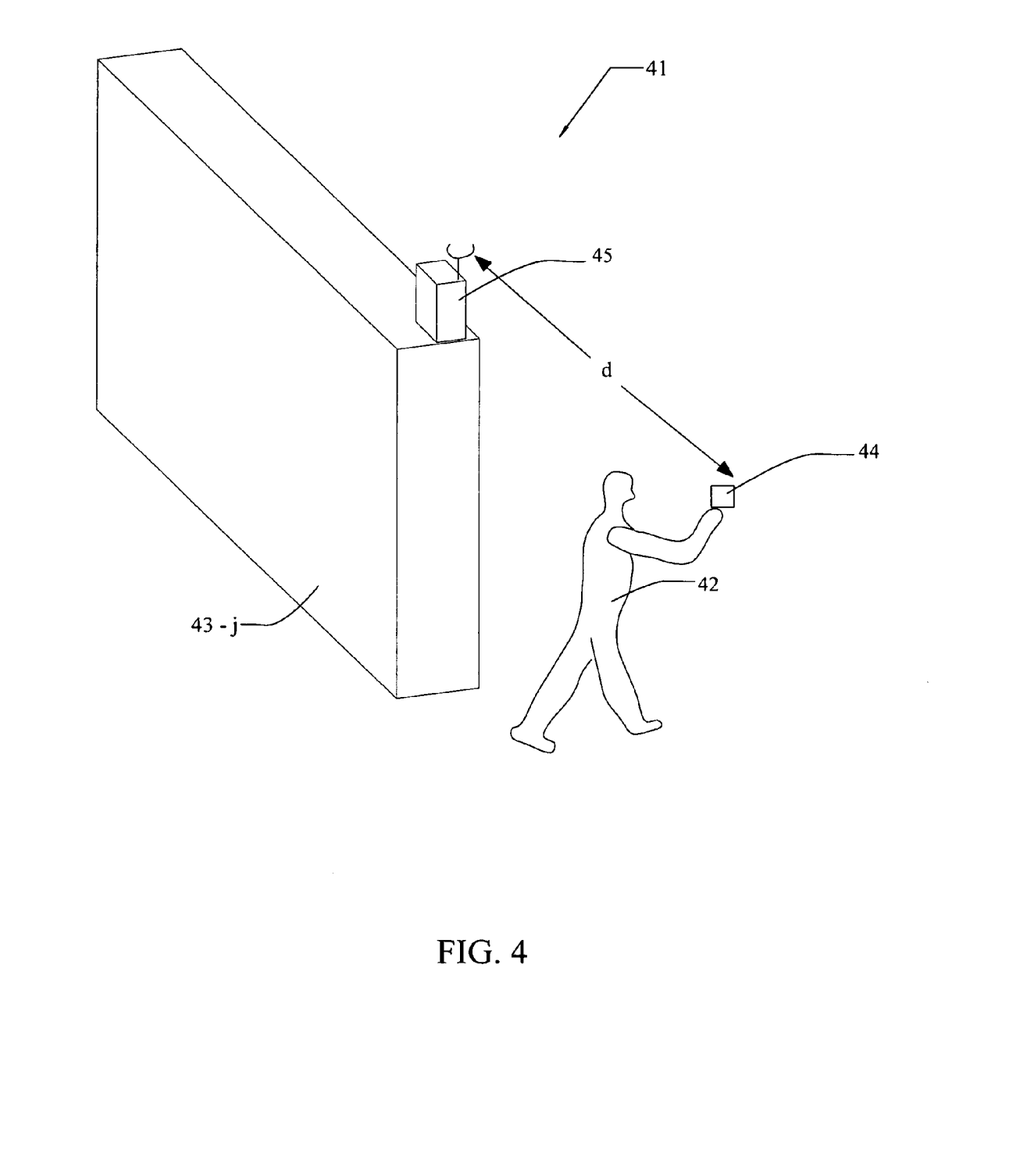
FIG. 4 illustrates another embodiment of the invention.

FIG. 4 illustrates another embodiment 41, in which a sight-impaired ("SI") person seeks either an inventory item or information concerning an inventory item. The SI user 42 passes by an inventory stack or shelving 43-$i$ ($i=1, \ldots, N; N \geq 1$) holding an inventory interrogation card (IIC) 44 so that a selected face of the card is oriented in the general direction of one of the stacks, or in the general direction of a central transmitter 45. Periodically, each stack 43-$i$ and/or the central transceiver 45, transmits an indicator signal to determine if an IIC 44 is present, through receipt of the indicator signal and reflection (after suitable modification) of a modified indicator signal that is subsequently received as a return signal, by the stack 43-$i$ and/or by the central transceiver 45. Where no modified indicator signal is received, the system takes no further action Receipt of the modified indicator signal indicates that a user 42 is present, and the stacks are advised of the presence of a user. When the user 42 passes within a selected threshold distance d(thr) (e.g., d(thr)=6-120 inches) of one of the stacks 43-$j$, that stack will provide an audibly perceptible signal APS announcing the group(s) or class(es) of inventory items that are present on the shelf 43-$j$.

The intensity of the reflected (modified) indicator signal may be used to estimate a distance of the user from the signal monitor or stack in the following manner. The intensity I of the indicator signal (assumed to be isotropic) will decrease according to an inverse square law, $$I(d)=I_0(d_0/d)^2, \quad (1)$$

where the quantity $I_0 d_0^2$ is a normalizing factor, assumed to be known, and d is the monitor-IIC distance. Assuming that the IIC has a reflection coefficient (measured beforehand) of ρ, each signal-reflecting point on the IIC is treated as a new source so that the reflected signal intensity received at the signal monitor is approximately $$I(d;\text{refl})=I_0(d_0/d)^2=I_0(\rho d_0^2)/d^4, \quad (2A)$$

or $$I_0(\rho d_0^2)/I(d;\text{refl})=d^4. \quad (2B)$$

Equation (2B) permits an estimate of the distance d to be made, for comparison with a selected threshold distance d(thr) (e.g., d(thr) in a range 6-120 inches). Where the estimated distance d is no greater than d(thr), the system can provide an audibly perceptible or visually perceptible signal of selected information on the class(es) of inventory available on the corresponding inventory container or shelf. Where the distance d is greater than d(thr), the system has at least three options: (1) provide no information concerning the class(es) of inventory available on the corresponding inventory container; (2) provide the same information as where $d \leq d(\text{thr})$; and (3) provide a reduced set of information, such as a less detailed summary of the information included under option (2).

The IIC 44 is preferably fabricated to provide a reflected image that is modified from the original incident image. For example, the IIC 44 may delete all wavelengths 1 in a selected wavelength region, $\lambda 1 \leq \lambda \leq \lambda 2$, by use of an appropriate interference coating. This allows the system to distinguish between an original signal, containing all wavelengths in a given range, and a modified reflected signal in which a particular band of wavelengths is deleted. By deleting different ranges of wavelengths for each sense-impaired user, the system can even distinguish between different users, by comparison of the deleted wavelength range for each modified reflected signal.

Alternatively, if the user 42 is hearing-impaired but not sight-impaired, the system will provide a visually perceptible signal VPS, announcing or otherwise indicating the group(s) or class(es) of inventory items that are present on the shelf 43-j.

Figure 5:
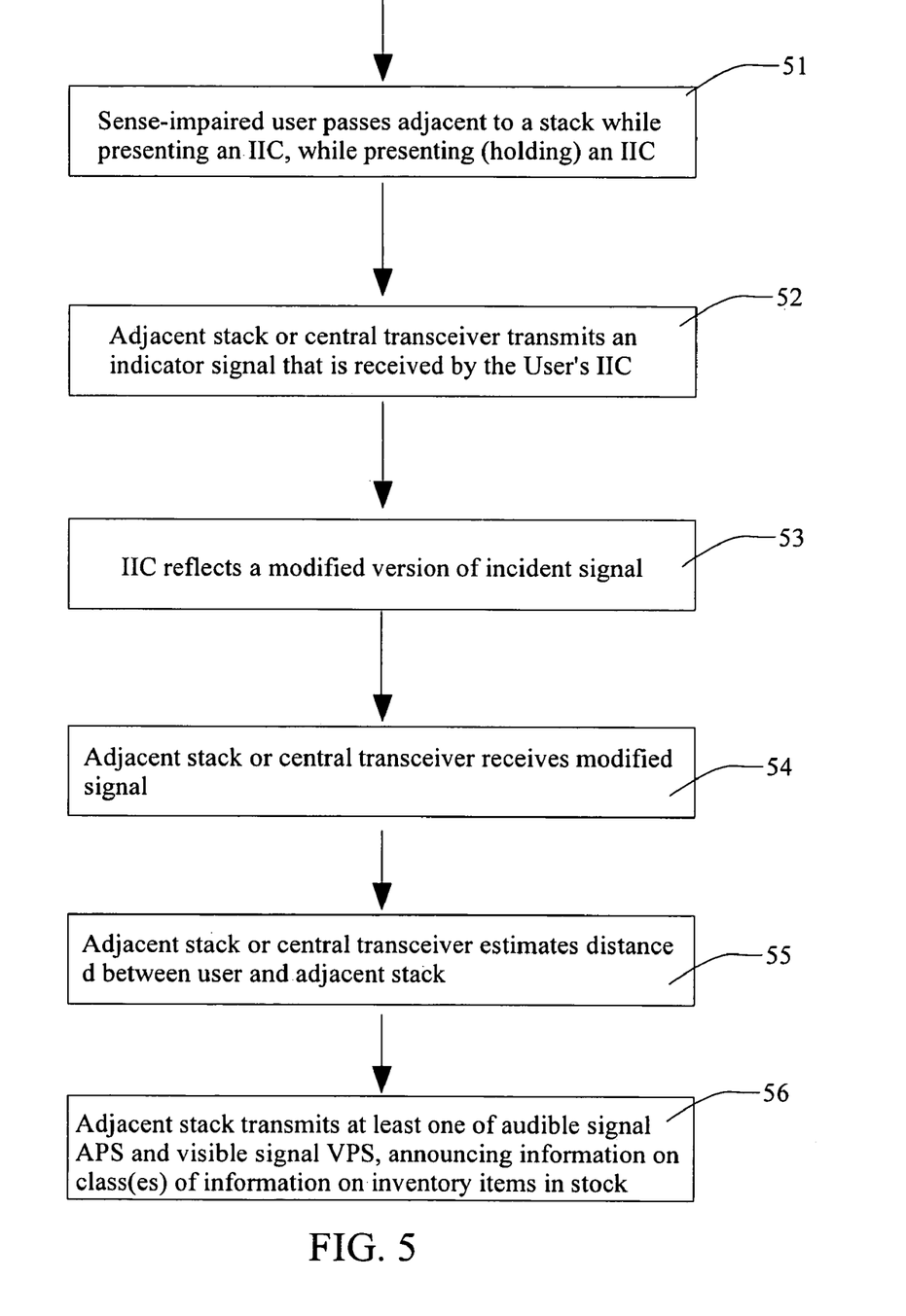
FIG. 5 is a flow chart for practicing this embodiment.

FIG. 5 is a flow chart indicating a procedure for practicing this embodiment of the invention. In step 51, a "sense-impaired user" (i.e., a user who is sight-impaired and/or hearing-impaired) passes adjacent to one or more stacks, while holding an inventory interrogation card ("IIC") so that a selected face is oriented in a direction generally facing one or more of the stacks, or facing a central transceiver. In step 52, one or more stacks and/or the central transceiver periodically transmits an indicator signal that is received by the IIC. In step 53, the received indicator signal is modified and reflected by the IIC. In step 54, the modified indicator signal is received by one or more of the stacks and/or the central transceiver. In step 55, the system estimates, from the intensity of the return signal, a distance d of the IIC from a nearest stack. In step 56, the nearest stack is caused to transmit at least one of an audibly perceptible signal APS and a visually perceptible signal VPS, announcing or otherwise indicating the group(s) or class(es) of inventory items that are present on the stack.

What is claimed is:

1. A method for providing information on availability and/or status and/or location of one or more specified inventory items, the method comprising:

providing an electromagnetic energy source that generates and transmits energy over a wireless energy path;

providing at least one of a specified inventory item and a specified class of inventory items as a target inventory item, among an array of inventory items, with an electromagnetic mechanism that receives and utilizes electromagnetic energy from the energy source;

receiving an electronic inquiry concerning information associated with the target inventory item;

determining, through use of a computer, at least one of the following availability, status and location information items: (i) whether the target inventory item is located at or adjacent to at least one determinable inventory item location; and (ii) present status information for the target inventory item, where the present status information includes at least one of presence or absence of the target inventory item in the array, at least one present location, if known, of the target inventory item, and operational readiness of the target inventory item; and (iii) at least one of user name and user contact information, if the target inventory item is not located at or adjacent to the determinable inventory item location and has been removed by an identifiable user;

determining and displaying for at least one time, the status, if known, of at least one of the target inventory items, where the status is characterized by the group of characteristics consisting of absent, use-ready, inactivated for maintenance, permanently inactivated, and withdrawn from use;

determining and displaying at least one time, if known, at which the target inventory item was removed or examined or maintained or repaired or modified or substituted or replaced;

providing information on at least one attribute associated with the target inventory item, in response to receipt of the electronic inquiry, where the at least one attribute is one or more of (1) number of replicas of the target inventory item that should be present in inventory, and (2) name or contact information for user, if the target inventory item has been removed or examined or maintained or repaired or modified or substituted or replaced;

when the target inventory item is located at or adjacent to the determinable location, providing at least one of a visibly perceptible signal and an audibly perceptible signal indicating present location of at least one of the target inventory item;

when the target inventory item is not located at or adjacent to the determinable location, determining if the target inventory item is located elsewhere in the array; and when the target inventory item is determined to be located elsewhere in the array, providing an indicium indicating the present location of the target inventory item.

2. The method of claim 1, further comprising: when said target inventory item is not located at or adjacent to said determinable location and is not located elsewhere in said array, providing a second indicium indicating that said target inventory item is not present in said array.

3. The method of claim 1, further comprising terminating said at least one of said visibly perceptible signal and said audibly perceptible signal, at a time determined with reference to at least one of (i) accumulation of a time interval, after said visibly perceptible signal or said audibly perceptible signal is first provided with a time interval length at least equal to a threshold length and (ii) removal of said target inventory item from said location.

4. The method of claim 1, further comprising receiving said electronic inquiry at a radio frequency identity detector ("RFID") associated with said specified inventory item or class.

5. The method of claim 4, further comprising providing at least one of said location information and said status information for said target inventory item using said RFID.

6. The method of claim 1, further comprising providing said visually perceptible signal as a selected color signal that is distinguishable from at least one other color signal used to indicate location of another target inventory item.

7. The method of claim 1, further comprising:

specifying, as said target inventory item, a restricted item for which at least one of access to, and use of, the restricted item is restricted and has an assigned location;

requiring presentation, by a user who seeks at least one of access to, and use of, the restricted item, of at least one biometric indicium that establishes that the user has a right to access to and use of the restricted item;

determining whether the restricted item is located at or adjacent to its assigned location; and when the restricted item is not at or adjacent to its assigned location, issuing an advisory signal and determining whether at least one of the restricted item is located at or adjacent to a location other than an assigned location.

8. The method of claim 7, further comprising:

associating a required level for access with said restricted item;

requiring presentation and authentication of a user access level by said user who seeks at least one of access to, and use of, said restricted item; and permitting access by said user to said restricted item only if said user's authenticated access level is at least equal to the required level for access or use.

9. The method of claim 1, further comprising periodically transmitting, to a central receiver, each of said ASL information items, and receiving and storing said transmitted ASL information items in a selected memory unit associated with the central receiver; and overwriting said ASL information items received and stored in the selected memory unit during one time period with said ASL information items received during a subsequent time period.

\* \* \* \* \*